United States Patent [19]

Davis

[11] Patent Number: 5,690,399
[45] Date of Patent: Nov. 25, 1997

[54] COMPACT DISK STROAGE CABINET

[76] Inventor: Randal H. Davis, 121 Bortondale Rd., Media, Pa. 19063

[21] Appl. No.: 630,924

[22] Filed: Apr. 5, 1996

[51] Int. Cl.$^6$ .................................................. A47B 81/06
[52] U.S. Cl. ........................ 312/9.58; 211/40; 211/163; 312/111; 312/9.54; 312/9.55; 312/1.35; 312/305
[58] Field of Search ....................... 312/9.47, 9.53, 312/9.54, 9.55, 9.58, 9.9, 117, 125, 135, 249.2, 305, 111; 211/40, 163, 165, 168, 169; 108/94

[56] References Cited

U.S. PATENT DOCUMENTS

| D. 240,579 | 7/1976 | Bower | D6/407 |
|---|---|---|---|
| D. 252,125 | 6/1979 | Oakley et al. | D6/407 X |
| D. 361,687 | 8/1995 | Dow et al. | D6/407 X |
| 1,416,566 | 5/1922 | McCleary | 312/125 |
| 1,421,391 | 7/1922 | Bower | 211/40 |
| 1,426,568 | 8/1922 | Hutshing | 312/9.46 |
| 1,445,340 | 2/1923 | Meares | 312/9.46 |
| 1,569,365 | 1/1926 | Goldberg | 211/163 |
| 2,795,474 | 6/1957 | Carbary | 312/326 X |
| 3,181,706 | 5/1965 | Mandel | 211/169 X |
| 3,337,059 | 8/1967 | Le Hoy | 211/40 X |
| 4,577,914 | 3/1986 | Stravitz | D6/407 X |
| 5,088,619 | 2/1992 | Shank | 312/111 X |

FOREIGN PATENT DOCUMENTS

| 877197 | 8/1971 | Canada | 312/114 |
|---|---|---|---|

Primary Examiner—Laurie K. Cranmer
Assistant Examiner—Janet M. Wilkens

[57] ABSTRACT

A compact disk storage cabinet adapted for use in association with single and double compact disk cases, the apparatus comprises an outer shell including a rear wall, two side walls, a roof, a floor and a hingedly attached door, a central shaft being formed in a cylindrical configuration with an upper end affixed to the roof and a lower end affixed to the floor; and a plurality of compact disk carrier racks each comprising a vertical member and a plurality of horizontal arms, each vertical member including side walls, each horizontal arm having an upper surface and a lower surface, each arm including side walls extending above and below the upper and lower surfaces, the lower surface, upper surface and vertical member between adjacent arms defining individual compact disk carrier units, each vertical member including at least one hinge extending therefrom, the hinges adapted to be coupled to the central shaft of the apparatus, the racks being positioned in a circumferential orientation around the central shaft, the carrier racks being rotatable 360 degrees around the central shaft.

1 Claim, 5 Drawing Sheets

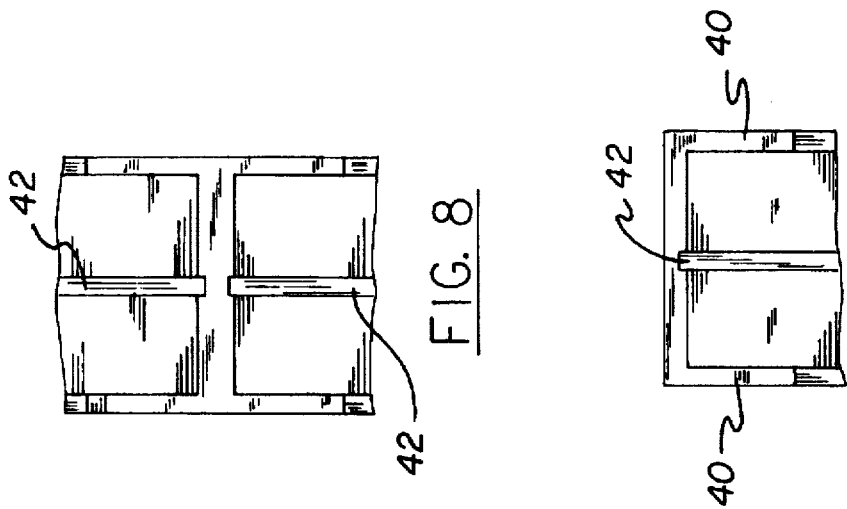
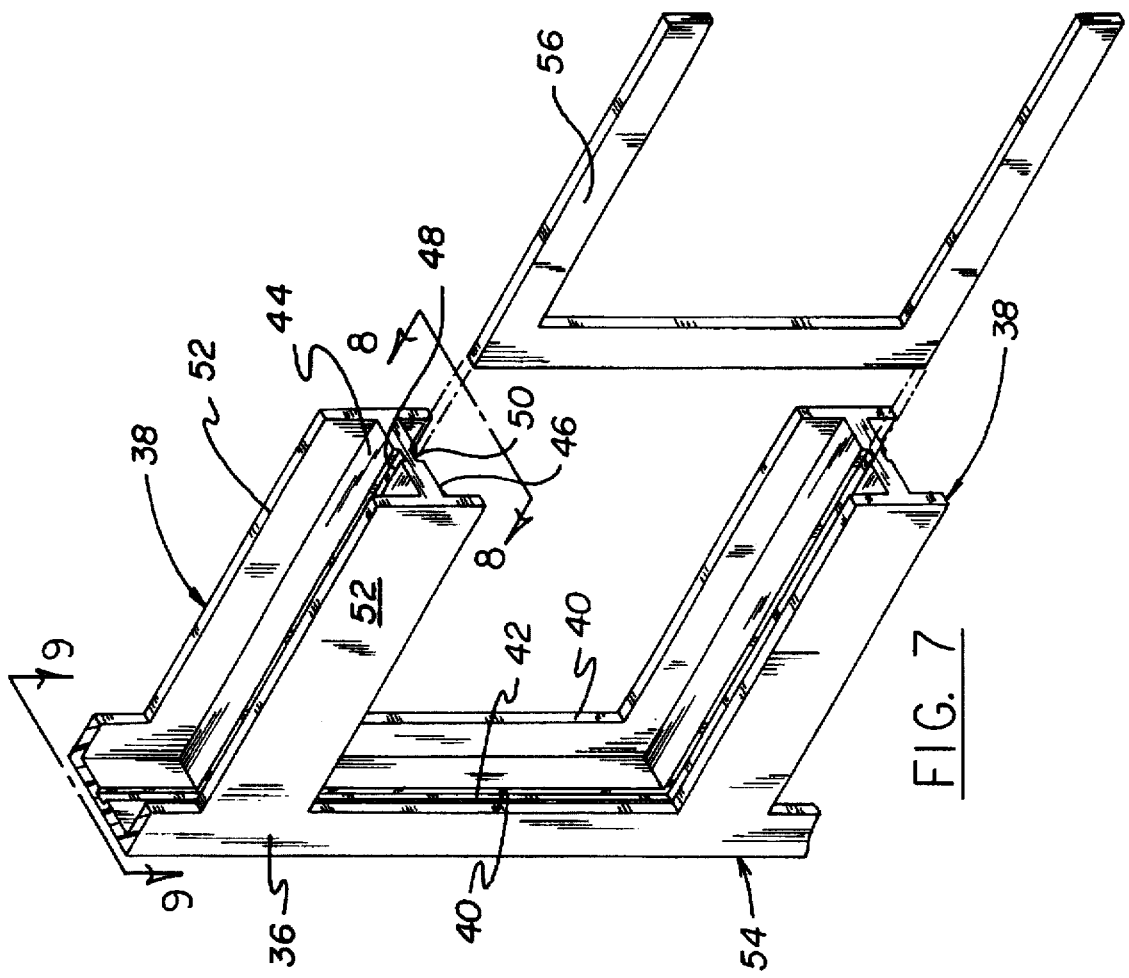

COMPACT DISK STROAGE CABINET

BACKGROUND OF THE INVENTION

1. Field of the Invention

The present invention relates to a compact disk storage cabinet and more particularly pertains to storing compact disks within holders which are rotatably coupled to the central shaft of the apparatus. This configuration allows users to view the front of the CD case while also providing for easy removal of the CD.

2. Description of the Prior Art

The use of compact disk storage devices is known in the prior art. More specifically, compact disk storage devices heretofore devised and utilized for the purpose of storing and transporting compact disks are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,255,970 to Theosabrata a storage cabinet.

U.S. Pat. No. 5,246,284 to Merzon discloses a storage cabinet and cabinet module for selectively storing tape cassettes and discs.

U.S. Pat. No. 5,335,795 to Chizen discloses a storage rack for cassettes and compact discs.

U.S. Pat. No. Des. 320,514 to Smith discloses a cabinet for audio/video cassette tapes and compact discs.

U.S. Pat. No. Des. 330,120 to Temple discloses a storage cabinet for compact discs.

Lastly, U.S. Pat. No. Des. 337,919 to van der Molen discloses a compact disc storage cabinet.

In this respect, the compact disk storage cabinet according to the present invention substantially departs from the conventional concepts and designs of the prior art, and in doing so provides an apparatus primarily developed for the purpose of storing compact disks within holders which are rotatably coupled to the central shaft of the apparatus. This configuration allows users to view the front of the compact disc case while also providing for easy removal of the compact disc.

Therefore, it can be appreciated that there exists a continuing need for a new and improved compact disk storage cabinet which can be used for storing compact disks within holders which are rotatably coupled to the central shaft of the apparatus. This configuration allows users to view the front of the compact disc case while also providing for easy removal of the compact disc. The prior art compact disc storage devices cases do not facilitate viewing and removal of compact discs. In this regard, the present invention substantially fulfills this need.

SUMMARY OF THE INVENTION

In view of the foregoing disadvantages inherent in the known types of compact disk storage devices now present in the prior art, the present invention provides an improved compact disk storage cabinet. As such, the general purpose of the present invention, which will be described subsequently in greater detail, is to provide a new and improved compact disk storage cabinet and method which has all the advantages of the prior art and none of the disadvantages.

To attain this, the present invention essentially comprises a new and improved compact disk storage cabinet adapted for use in association with single and double compact disk cases, the apparatus comprising, in combination: an outer shell formed in the configuration of a hollow box with a rear wall, a first side wall, a second side wall, a roof and a floor, each side wall having a front edge, a transparent door formed in a curved configuration, the door having a first vertical side edge coupled to the front edge of the first side wall of the outer shell by a plurality of pivotable hinges, the door being curved outwardly with respect to the rear wall of the outer shell, the roof and the floor of the outer shell each including at least two cylindrical peg bores extending therein, at least two cylindrical shaped elastomeric pegs being included with the apparatus and positioned within the peg bores to permit stacking of one cabinet on top of another; a central shaft formed in an elongated generally cylindrical configuration with an upper end and a lower end, the upper end of the shaft being coupled to the approximate center point of the roof of the outer shell, the lower end of the central shaft being coupled to the approximate center point of the floor of the outer shell; and twelve compact disk carrier racks each comprising a vertical member and a plurality of perpendicularly extending horizontal arms, each vertical member including side walls, each vertical member having an outer surface including a centrally positioned guide slot, each horizontally extending arm having an upper surface and a lower surface, the upper and lower surfaces each including a centrally positioned guide slot, each arm including side walls extending above and below the upper and lower surfaces, the lower surface, upper surface and vertical member between adjacent arms defining individual compact disk carrier units, a plurality of removable center dividers being formed in a generally C-shaped configuration, the center dividers being slidably positionable within the guide slots of individual compact disk carrier units, with a center divider positioned within a unit to separate two compact disk cases being positionable within a unit, absent a center divider a double compact disk case being positionable within a unit, each vertical member having an inner surface including a at least one generally circular shaped hinge extending therefrom, the hinges adapted to be coupled to the central shaft of the apparatus, the twelve racks being positioned in a circumferential orientation around the central shaft, the hinges of each rack being positioned in different locations to permit stacked positioning of the hinges one above another.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved compact disk storage cabinet which has all of the advantages of the prior art compact disk storage devices and none of the disadvantages.

It is another object of the present invention to provide a new and improved compact disk storage cabinet which may be easily and efficiently manufactured and marketed.

It is further object of the present invention to provide a new and improved compact disk storage cabinet which is of durable and reliable constructions.

An even further object of the present invention is to provide a new and improved compact disk storage cabinet which is susceptible of a low cost of manufacture with regard to both materials and labor, and which accordingly is then susceptible of low prices of sale to the consuming public, thereby making such compact disk storage cabinet economically available to the buying public.

Still yet another object of the present invention is to provide a new and improved compact disk storage cabinet which provides in the apparatuses and methods of the prior art some of the advantages thereof, while simultaneously overcoming some of the disadvantages normally associated therewith.

Still another object of the present invention is to store compact disks within holders which are rotatably coupled to the central shaft of the apparatus.

Lastly, it is an object of the present invention to provide a new and improved compact disk storage cabinet adapted for use in association with single and double compact disk cases, the apparatus comprising: an outer shell including a rear wall, two side walls, a roof, a floor and a hingedly attached door, a central shaft being formed in a cylindrical configuration with an upper end affixed to the roof and a lower end affixed to the floor; and a plurality of compact disk carrier racks each comprising a vertical member and a plurality of horizontal arms, each vertical member including side walls, each horizontal arm having an upper surface and a lower surface, each arm including side walls extending above and below the upper and lower surfaces, the lower surface, upper surface and vertical member between adjacent arms defining individual compact disk carrier units, each vertical member including at least one hinge extending therefrom, the hinges adapted to be coupled to the central shaft of the apparatus, the racks being positioned in a circumferential orientation around the central shaft, the carrier racks being rotatable 360 degrees around the central shaft so a user can flip through his collection and view them, as well as remove them more easily.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects' other than those set forth above will become apparent when consideration is given to the following detailed description thereof. Such description makes reference to the annexed drawings wherein:

FIG. 7 is a separated perspective view of the compact disk carrier rack illustrating the positioning of the removable center divider positioned within each compact disk carrier unit.

FIG. 8 is a front elevational view of an arm of the compact disk carrier rack taken along section line 8—8 of FIG. 7.

FIG. 9 is a top perspective view of the vertical member of the compact disk carrier rack taken along section line 9—9 of FIG. 7.

The same reference numerals refer to the same parts through the various Figures.

DESCRIPTION OF THE PREFERRED EMBODIMENT

Figures 1, 2:
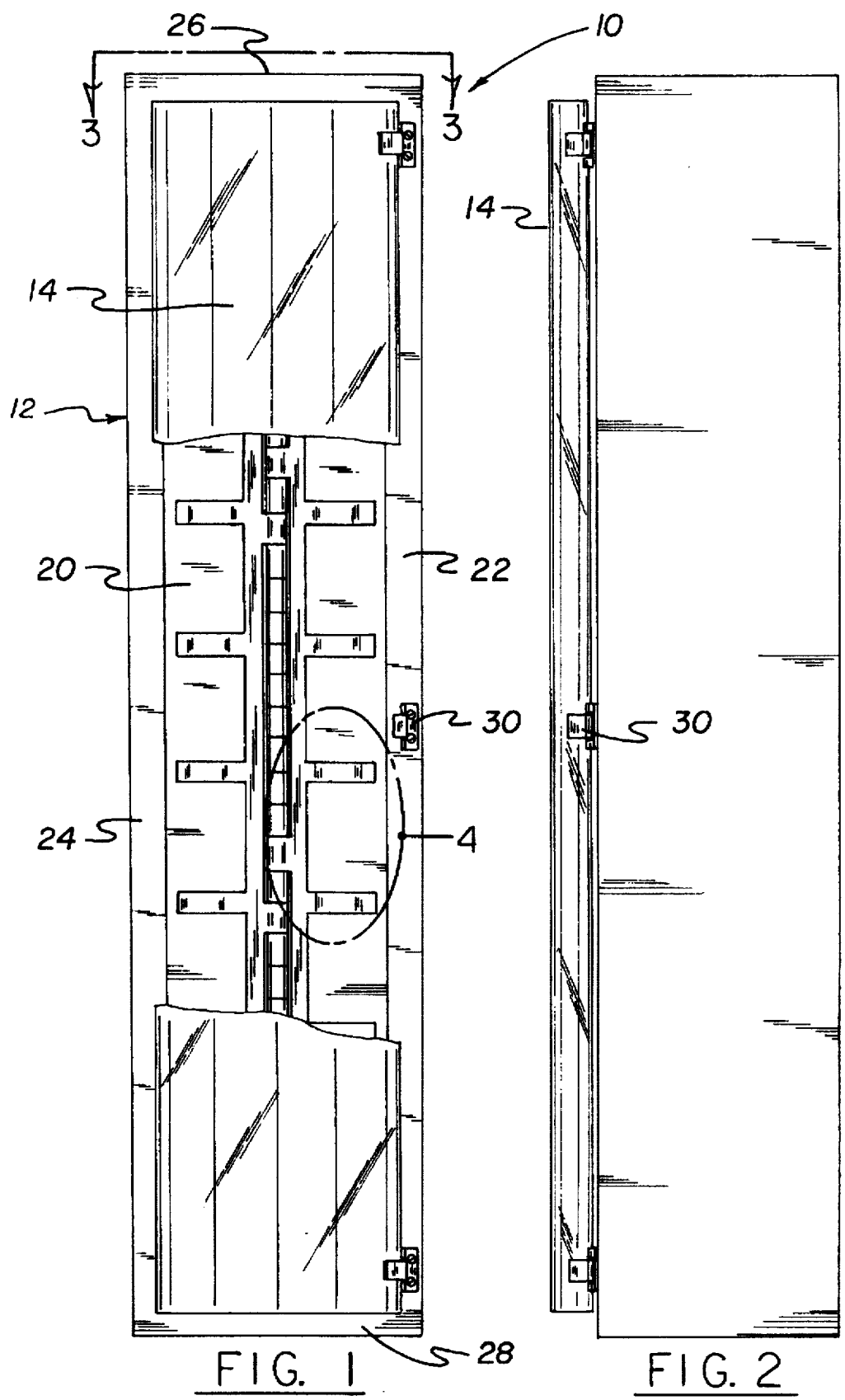
FIG. 1 is a perspective view of the preferred embodiment of the compact disk storage cabinet constructed in accordance with the principles of the present invention.
FIG. 2 is a side perspective view of the apparatus shown in FIG. 1.

With reference now to the drawings, and in particular to FIG. 1 thereof, the preferred embodiment of the new and improved compact disk storage cabinet embodying the principles and concepts of the present invention and generally designated by the reference numeral 10 will be described.

The present invention, the compact disk storage cabinet 10 is comprised of a plurality of components. Such components in their broadest context include an outer shell 12, a door 14, a central shaft 16 and twelve compact disk carrier racks 18. Such components are individually configured and correlated with respect to each other so as to attain the desired objective.

In the preferred embodiment the compact disc storage cabinet 10 is utilized for the storage of compact discs. The carrier racks are specifically sized and configured to hold compact disc cases. However, in alternate embodiments other types of electronic media could be stored in the apparatus. Such electronic media include, but are not limited to the following: audio cassettes, video cassettes, video discs, game cartridges, compact cards, mini discs and other forms of electronic storage devices. In such alternate embodiments, the dimensions of the carrier racks and other components of the apparatus have the requisite dimensions to store the particular electronic media being utilized.

The compact disk storage cabinet 10 is adapted for use in association with single and double compact disk cases. The apparatus may be sold fully assembled or in a disassembled kit. Most compact disc cases contain only one compact disc. However, some cases are twice the width to accommodate two compact discs. The preferred embodiment of the apparatus is adapted to accommodate both single and double compact disk cases by utilizing a removable divider to compartmentalize each carrier rack, a feature previously unavailable in the prior art. The apparatus includes an outer shell 12 formed in the configuration of a hollow box with a rear wall 20, a first side wall 22, a second side wall 24, a roof 26 and a floor 28. The outer shell is about the size of a standard three foot stereo speaker. Each side wall has a front edge. In the preferred embodiment the cabinet is fabricated of plywood type materials. The cabinet may also be manufactured of plastic, plexiglass or other synthetic materials. Note FIGS. 1 and 2.

Figure 10:
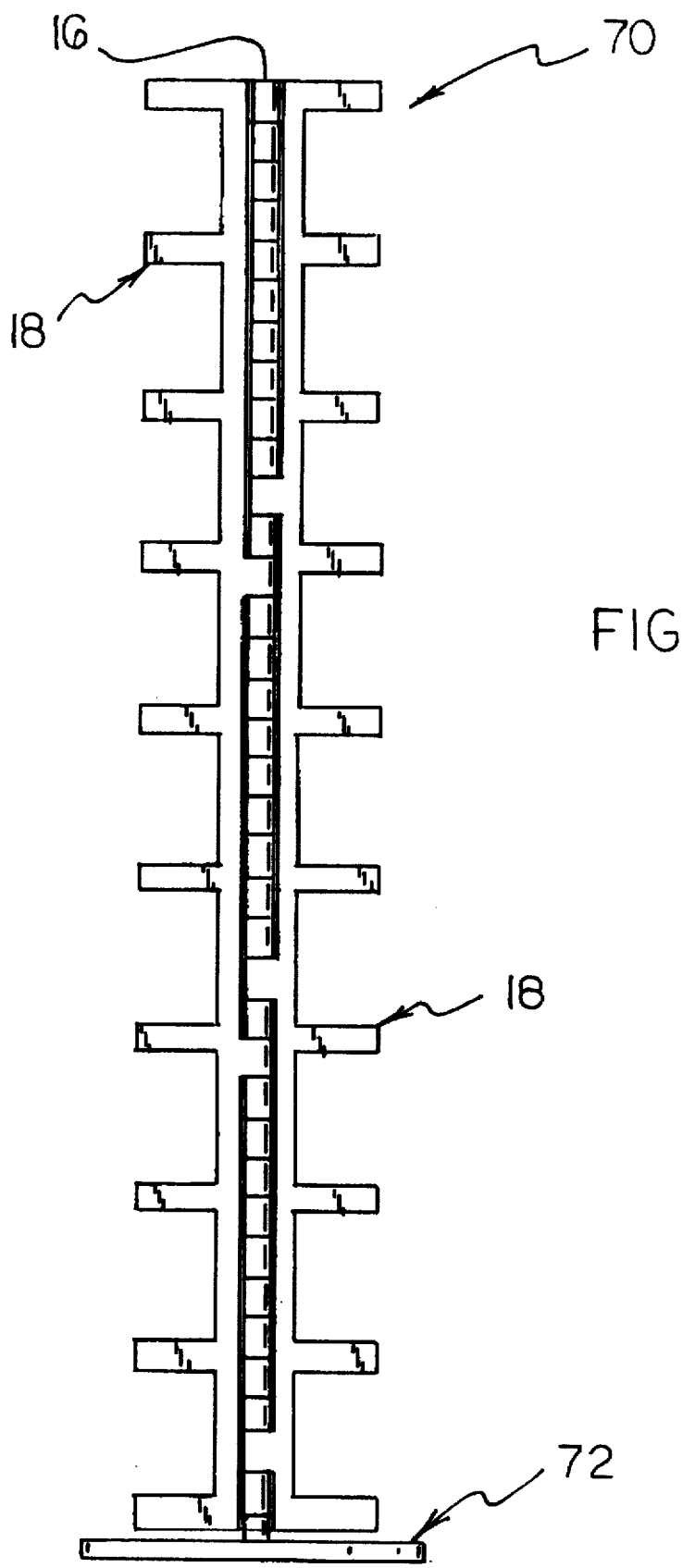
FIG. 10 is an isolated perspective view of an alternative embodiment of the apparatus illustrating the central shaft and carrier racks utilized as an open carousel.

An alternative embodiment of the compact disc storage cabinet 70 is shown in FIG. 10. In such embodiment the central shaft of the apparatus is mounted in a planar circular base 72 instead of an outer shell. This configuration permits utilization of the apparatus as an open carousel. This embodiment may also be utilized in association with an existing cabinet. Note FIG. 10.

Figure 3:
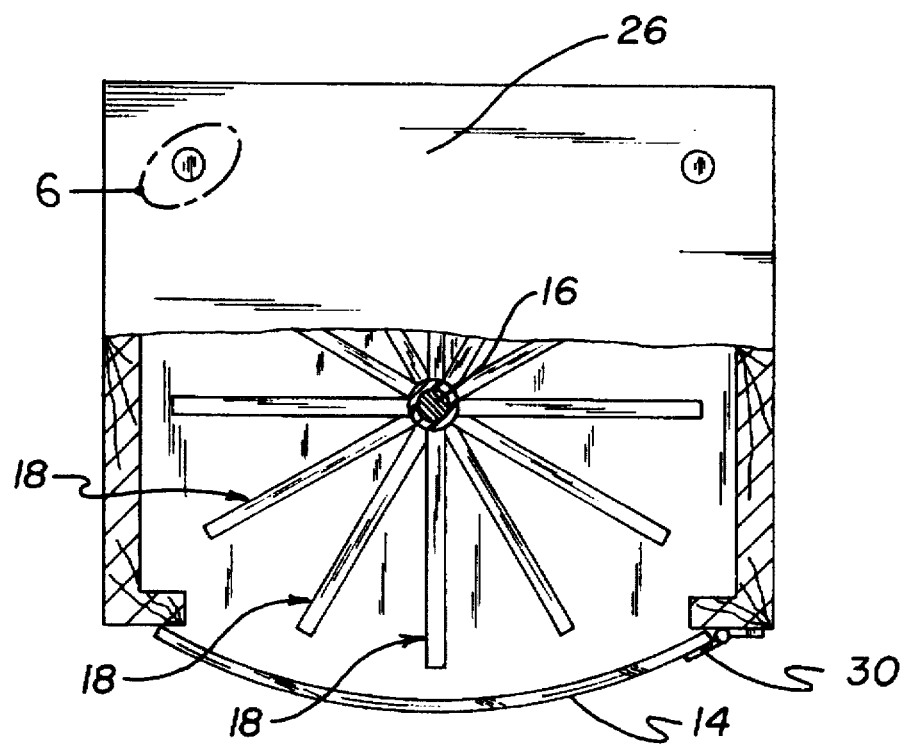
FIG. 3 is a partially broken away top perspective view of the apparatus taken along section line 3—3 of FIG. 1.
Figure 6:
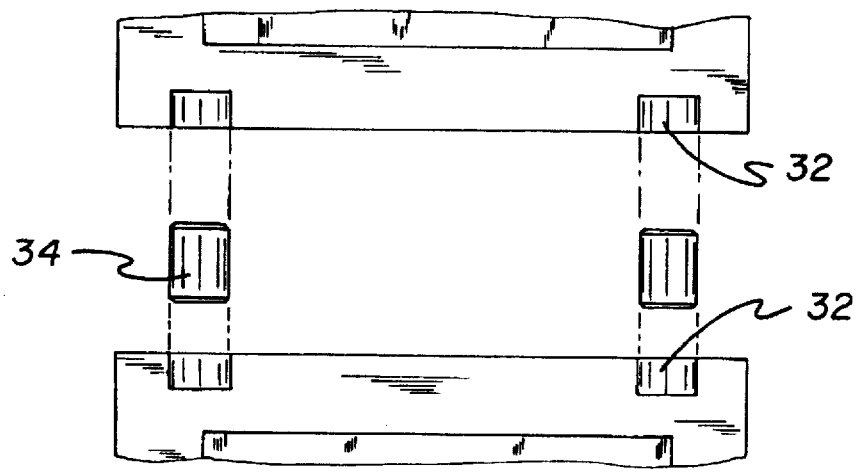
FIG. 6 is an isolated perspective view of the cylindrical peg bores and elastomeric pegs of the apparatus.

A transparent door 14 is formed in a curved configuration. In the preferred embodiment the transparent door is fabricated of plexiglass to enable user to view compact discs even when the door is closed. The door has a first vertical side edge which is coupled to the front edge of the first side wall of the outer shell by a plurality of pivotable hinges 30. The door is curved outwardly with respect to the rear wall of the outer shell. The curved door allows more compact discs cases to be stored within the apparatus than if the door was formed in a linear configuration. The upper surface of the roof and lower surface of the floor of the outer shell each include at least two cylindrical peg bores 32 extending within them. At least two cylindrical shaped elastomeric pegs 34 are included with the apparatus and are positioned within the peg bores to permit stacking of one cabinet on top of another. Some embodiments of the apparatus do not include peg bores or elastomeric pegs. Other embodiments include four peg bores and elastomeric pegs to permit stacking of the compact disk cabinets on top of each other. The elastomeric pegs also prevent damage to the floor surface upon which the apparatus is positioned. Note FIGS. 1, 3 and 6.

Figure 4:
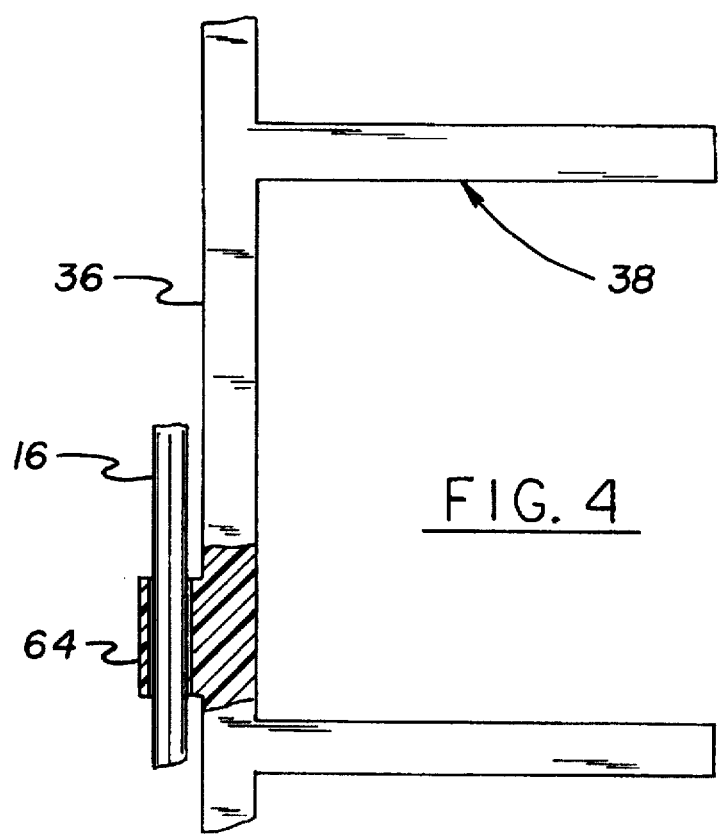
FIG. 4 is a partially broken away perspective view of a compact disk carrier rack of the apparatus.

A central shaft 16 is formed in an elongated generally cylindrical configuration with an upper end and a lower end. The upper end of the shaft is releasably coupled to the approximate center point of the roof of the outer shell. The releasable coupling permits easy detachment of the rod when placing racks upon it. The lower end of the central shaft is releasably coupled to the approximate center point of the floor of the outer shell. In the preferred embodiment the shaft is fabricated of plastic or metal. Note FIGS. 1, 3 and 4.

Twelve compact disk carrier racks 18 each comprise a vertical member 36 and a plurality of perpendicularly extending horizontal arms 38. The perpendicularly extending horizontal arms are positioned in a parallel plane with each other. Each vertical member includes side walls 40. Each vertical member has an outer surface which includes a centrally positioned guide slot 42. Each horizontally extending arm has an upper surface 44 and a lower surface 46. The upper and lower surfaces each include a centrally positioned guide slot 48, 50. Each arm includes side walls 52 which extend above and below its respective upper and lower surfaces. The side walls serve to securely retain compact disc cases. Note FIGS. 7-9.

The lower surface, upper surface and vertical member between adjacent arms define individual compact disk carrier units 54. Each individual compact disc carrier unit is adapted to retain either two single or one double compact disc case at a time. A plurality of removable center dividers 56 are formed in a generally C-shaped configuration. The center dividers are slidably positionable within the guide slots of individual compact disk carrier units 38. When a center divider is positioned within a unit, two separate compact disk cases are positionable within a unit. Absent a center divider a double compact disk case is positionable within a unit. Note FIG. 7.

Figure 5:
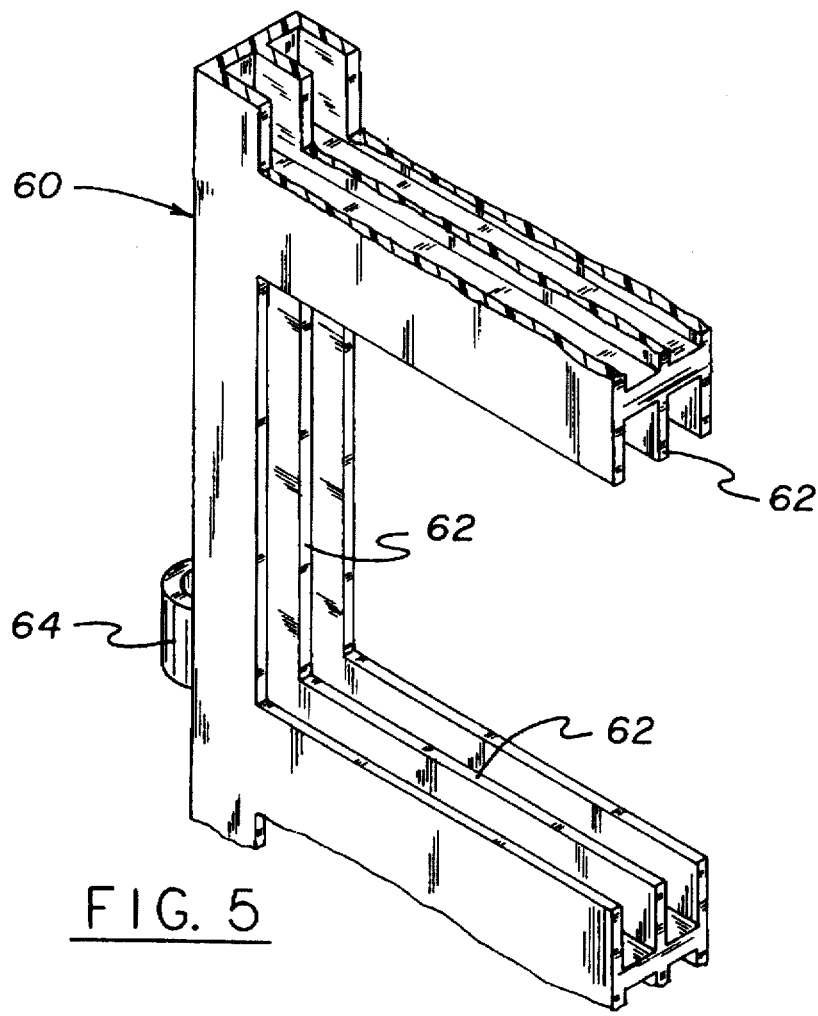
FIG. 5 is an isolated perspective view of an alternative embodiment of the compact disk carrier rack illustrating the central divider formed contiguously with the arms and vertical member of the apparatus.

An alternative embodiment of the apparatus is disclosed in FIG. 5. In this embodiment each compact disk carrier unit 60 includes an integrally formed center divider 62 configured in a generally C-shaped configuration and affixed centrally within each individual compact disk carrier unit. Individual units of the alternate embodiment may be utilized in conjunction with individual units of the preferred embodiment. The alternate embodiment is utilized when a user does not anticipate the need for double compact disc cases to be held in storage. Note FIG. 5.

Each vertical member has an inner surface which includes at least one generally circular shaped hinge 64 extending from it. The hinges are adapted to be rotatably coupled to the central shaft 16 of the apparatus. The twelve racks are positioned in a circumferential orientation around the central shaft extending radially therefrom. The hinges of each rack are positioned in different locations to permit stacked positioning of the hinges one above another. Each individual rack is slid over the top of the central shaft when assembling the apparatus. The rack having the lowest hinge would be positioned over the central shaft first. The rack having the second lowest hinge would then be positioned upon the central shaft, and so on until the twelve racks are coupled to the central shaft. In alternative embodiments of the apparatus any number of racks may be utilized. In the preferred embodiment, different numbers of racks may be coupled to the central shaft at any one time. The racks allow users to easily rotate the compact disc holders to permit viewing of the front faces of the compact disc cases in addition to the titles on the edges. This device also makes it easier to remove the cases than previous devices for housing compact discs. Note FIGS. 1 and 3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved compact disk storage cabinet apparatus adapted for use in association with single and double compact disk cases, the apparatus comprising, in combination:

an outer shell formed in the configuration of a hollow box with a rear wall, a first side wall, a second side wall, a roof and a floor, the roof and floor of the outer shell each including at least two cylindrical peg bores extending therein, at least two cylindrical shaped elastomeric pegs being included with the apparatus and positionable within the peg bores to permit stacking of one cabinet on top of another, each side wall having a front edge, a transparent door formed in a curved configuration, the door having a first vertical side edge coupled to the front edge of the first side wall of the outer shell by a plurality of pivotable hinges, the door being curved outwardly with respect to the rear wall of the outer shell;

a central shaft formed in an elongated generally cylindrical configuration with an upper end and a lower end, the upper end of the shaft being releasably coupled to the approximate center point of the roof of the outer shell, the lower end of the central shaft being releasably coupled to the approximate center point of the floor of the outer shell; and twelve compact disk carrier racks each comprising a vertical member and a plurality of perpendicularly extending horizontal arms, each vertical member including side walls, each vertical member having an outer surface including a centrally positioned guide slot, each horizontally extending arm having an upper surface and a lower surface, the upper and lower surfaces each including a centrally positioned guide slot, each arm including side walls extending above and below the upper and lower surfaces, the lower surface, upper surface and vertical member between adjacent arms defining individual compact disk carrier units, a plurality of removable center dividers being formed in a generally C-shaped configuration, the center dividers being slidably positionable within the guide slots of individual compact disk carrier units, with one of the center dividers positioned within one of the units two separate compact disk cases being positionable within the unit, absent the center divider a double compact disk case being positionable within the unit, each vertical member having an inner surface including at least one generally circular shaped hinge extending therefrom, the hinges adapted to be coupled to the central shaft of the apparatus, the twelve racks being positioned in a circumferential orientation around the central shaft rotatably mounted to the hinges of each rack, the hinges being positioned in different locations to permit stacked positioning of the hinges one above another.

\* \* \* \* \*

UNITED STATES PATENT AND TRADEMARK OFFICE
CERTIFICATE OF CORRECTION

PATENT NO. : 5,690,399
DATED : November 25, 1997
INVENTOR(S) : Randal H. Davis

It is certified that error appears in the above-indentified patent and that said Letters Patent is hereby corrected as shown below:

On the title page, item [54] and Col 1., should read --COMPACT DISK STORAGE CABINET--.

Signed and Sealed this

Thirtieth Day of June, 1998

*Attest:*

BRUCE LEHMAN

*Attesting Officer*  *Commissioner of Patents and Trademarks*